(12) United States Patent
Rascon et al.

(10) Patent No.: US 12,730,801 B2
(45) Date of Patent: Sep. 8, 2026

(54) SYSTEM AND METHOD FOR ENHANCING CHATBOT INTELLIGENCE THROUGH TRANSFORMER-BASED TABULAR QUESTION-ANSWERING MODEL INTEGRATION WITH CYCLICAL VECTOR DATASET GENERATION

(71) Applicant: Bank of America Corporation, Charlotte, NC (US)

(72) Inventors: Kristian Rascon, Plano, TX (US); Tarun Ravada, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 219 days.

(21) Appl. No.: 18/746,940

(22) Filed: Jun. 18, 2024

(65) Prior Publication Data

US 2025/0384030 A1 Dec. 18, 2025

(51) Int. Cl.
*G06F 16/22* (2019.01)
*G06F 16/242* (2019.01)

(52) U.S. Cl.
CPC ........ *G06F 16/243* (2019.01); *G06F 16/2237* (2019.01)

(58) Field of Classification Search
None
See application file for complete search history.

(56) References Cited

U.S. PATENT DOCUMENTS 11,080,607 B1 * 8/2021 Demtchenko ........ G06V 10/761
2025/0086170 A1 * 3/2025 Rumade .............. G06F 16/2237
2025/0117630 A1 * 4/2025 Taheri .................. G06N 3/0895

* cited by examiner

*Primary Examiner* — Scott A. Waldron
(74) *Attorney, Agent, or Firm* — Weiss & Arons LLP

(57) ABSTRACT

Methods and system for augmenting the intelligence of a chatbot by integrating a transformer-based tabular question-answering model with a dynamic vector dataset generation system. The methods and system may include receiving a question from a user. The methods and system may include sending the question to a retriever model and tokenizing the question into an input vector. The methods and system may include returning vectors having a threshold level of association with the input vector. The methods and system may include processing the vectors and the input vector using a transformer-based table reader pretrained for answering questions about relevant tables. The methods and system may include providing the user an answer to the question based on the processing without needing to perform additional logic and preprocessing on the relevant tables prior to sending the vectors to the transformer-based table reader.

20 Claims, 4 Drawing Sheets

SYSTEM AND METHOD FOR ENHANCING CHATBOT INTELLIGENCE THROUGH TRANSFORMER-BASED TABULAR QUESTION-ANSWERING MODEL INTEGRATION WITH CYCLICAL VECTOR DATASET GENERATION

FIELD OF TECHNOLOGY

Aspects of the disclosure relate to cyclical vector dataset generation for chatbot intelligence enhancement.

BACKGROUND OF THE DISCLOSURE

Chatbots have become integral tools for facilitating communication and accessing information across various domains—both internally within organizations and externally for customer service and support. But the effectiveness of chatbots is often limited by their ability to provide accurate and insightful responses to user queries, especially when dealing with complex or specialized domains. Traditional chatbot systems may rely on pre-defined responses or rule-based algorithms, which can be restrictive and prone to inaccuracies.

It would therefore be desirable to leverage cyclical vector dataset generation to scale up the number and variety of questions possible in a chatbot system. In such a system, it would further be desirable to configure an agnostic chatbot and shift the responsibility of the chatbot answering queries to dynamically structured data tables and vector dataset generation.

SUMMARY OF THE DISCLOSURE

A system and method for augmenting the intelligence of a chatbot by integrating a transformer-based tabular question-answering model with a dynamic vector dataset generation system is provided. By combining these two components, the chatbot may gain the capability to provide deep intelligence insights to users—whether within an organization or externally—thereby enhancing decision-making processes.

The proposed system addresses current limitations of chatbots by first receiving input from a chatbot user in the form of a natural language question. This question may be passed to a retriever model. The retriever model may tokenize the question into a vector.

A vector may be a one-dimensional array. A vector may be, e.g., a one-dimensional array of numbers. A vector may be displayed either in column form or row form. Vectors may be logical elements in computer, artificial intelligence ("AI"), chatbot, and programming languages. Vectors may be used for storing data.

The retriever model may query the vector database for a relevant table associated with an input vector. Data may be controlled in a vector database.

The retriever model may encode queries. Encoding queries may depend on a table reader, e.g., a question/answer model. The encoding may be configured for a similarity search operation, e.g., a similarity search. The encoding may depend on a transformer architecture.

The transformer architecture may include transformers. Transformers may include encoders. Encoders may encode input texts and language into encodings. Encodings may be tokenized vectors.

Transformers may include decoders. Decoders may process the encodings to understand the contextual information behind each vector.

Each encoder and decoder in the stack may use a transformer mechanism. The transformer mechanism may process each input vector for its tokens. The transformer mechanism may weigh the relevance of each token. The transformer mechanism, using the decoders, may generate an output vector. The transformer mechanism may enable dynamic highlighting and understanding of nuanced features of the input text.

The transformer mechanism may be illustrated with the following hypothetical user query: "What is my account balance projected to be? Please provide its projections for 1 month, 2 months, and 3 months." The transformer mechanism may, for example, allow the term "its" to be associated with the term "account balance." The system may understand that "its" does not refer to the word, e.g., "my." The transformer mechanism may weigh the relevance of the user query terms and assign a higher probability of relevance to the two terms, "its" and "account balance," than the other user query terms.

The data may be stored in a vector database. The vector database may capture semantic relationships between the data and data tables. As a result, the system and methods may narrow down possible answers and assist parsing the tables to reduce a quantity of selected tables to be queried. When the retriever model searches the vector database using a tokenized form of the user query, the vector database may return vectors. The vector database may return vectors that are most like the vector input tokens.

The vector database may be searched by a similarity search. A similarity search may include, e.g., a k-nearest neighbor ("kNN") search. This may enable the retriever model to return the most relevant data given a natural language user query. Data may be returned in table format.

Large language models ("LLMs") do not interpret language but rather tokens. Tokens may be derived from model map inputs or token mapping (e.g., language converted to numbers or numerically translated to values).

Tokenization is the process of converting pieces of language into bits of data that are usable for a computer program. Tokenization may be performed by a tokenizer. A tokenizer is an algorithm or function that performs tokenization, i.e., taking language and converting it into usable bits of data. Thus, a token is a unit of text that is efficiently segmented for LLM processing. Tokens may be equivalent to words or any other subset of language—parts of words, combinations of words, punctuation, etc.

Tokenizing language may translate the language into numbers. Numbers are computer processing format—computers process digital data. Using tokens instead of words may enable LLMs to handle larger amounts of data and more complex language. By breaking words into smaller parts by tokenization, LLMs may better handle new or unusual words by understanding their building blocks. Tokenization also enables the LLM to grasp language nuances, such as different word forms and contextual meanings.

Ultimately, tokenization provides a detailed language map. This allows the LLM to better understand the complexities of human communication, with limited data, different languages, complex words, and confidential, personal, and detailed queries.

For example, a dictionary of tokens may represent key value pairs. Key value pairs may be mapped in token sets. Information from key value pairs may be prompted in queries, e.g., "hi." For example, the term "hi" may be tokenized and equal to the value "1." The retriever model, following the token mapping, may receive a token, e.g., "1." The retriever model may see the number "1," but it may read the word "hi," when processing an answer. The similarity search may be run in the vector database in tokenized form, which may enhance variability of queries and data efficiency.

The vector database may send relevant data to a transformer-based table reader. The transformer-based table reader may process as input both the relevant data and the tokenized question. The transformer-based table reader may process both the data retrieved from the vector database and the tokenized question. The transformer-based table reader may generate a response for the chatbot user.

The transformer-based table reader may utilize a transformer architecture. The transformer architecture may be specifically designed and pretrained for answering questions about tabular data. This model, the "table reader model," paired with frequent and specialized generation of tables based on features regarding a user's data or internal domain knowledge is what powers the deep intelligence retrieval of insights.

The level of deep intelligence insights available to the user may be dependent on specific data and the form of the specific data available in the vector database. Tables may be regenerated and added to the vector database on a routine event schedule. On a routine event schedule, an event may trigger a data retriever service. The data retriever service may retrieve conventional database data from a cluster of database tables containing a user's data or internal domain data.

The data retriever service may send the data to a collection of common table generation services. The common table generation services may generate new tables. The new tables may be structured to be best interpreted by the transformer-based table reader model downstream. The common table generation services may send this data to a vectorizing service. The vectorizing service may tokenize the data. This tokenized data may be stored in the vector database.

The level of deep intelligence insights in this system is therefore tied to the robustness and variety of the table generation services in the common table generation service collection. The role of these table generation services is to restructure the existing data that is regularly collected to be more easily interpreted and provide more information to the transformer-based tabular question-answering model by explicitly writing metadata into table entries that offer desired additional insight about the data.

The common table generation services may explicitly write the data into the vector database itself. Thereafter, the table reader model can explicitly source the answer to a user question regarding the metadata entry without the need to perform additional logic and preprocessing on the table prior to prompting the table reader model.

If there is a probability that a user may experience a commercial event, the common table generation services may generate a table that contains commercial event information. For example, the common table generation services may take, e.g., account information from a conventional database. The common table generation services may create a new column for a running total of expenses for that user. The table may contain a historical expense list for the user. And any instance of, e.g., a commercial event in the past could be explicitly listed in the table for extraction and data analysis.

Such system and methods would trade chatbot responsibility for data implementation, structuring, and processing, enabling a scaling of a variety and number of possible queries. The system and methods may also increase computer processing efficiency by speeding up query responses.

The proposed system possesses broad applications across diverse domains. The system's adaptable architecture enables its utilization in various contexts, including but not limited to personalized commercial insights, consumer behavior analysis, internal reporting summarization, authentication history, and any other domain that depends on large tabular recording.

System and methods to leverage dynamically structured data sources using vector dataset processing for outputting query responses with reduced processing resources are provided. The system and methods may enable a diverse number of queries for chatbot interactions. The system and methods may enable the ability to utilize chatbots with reduced processing power.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
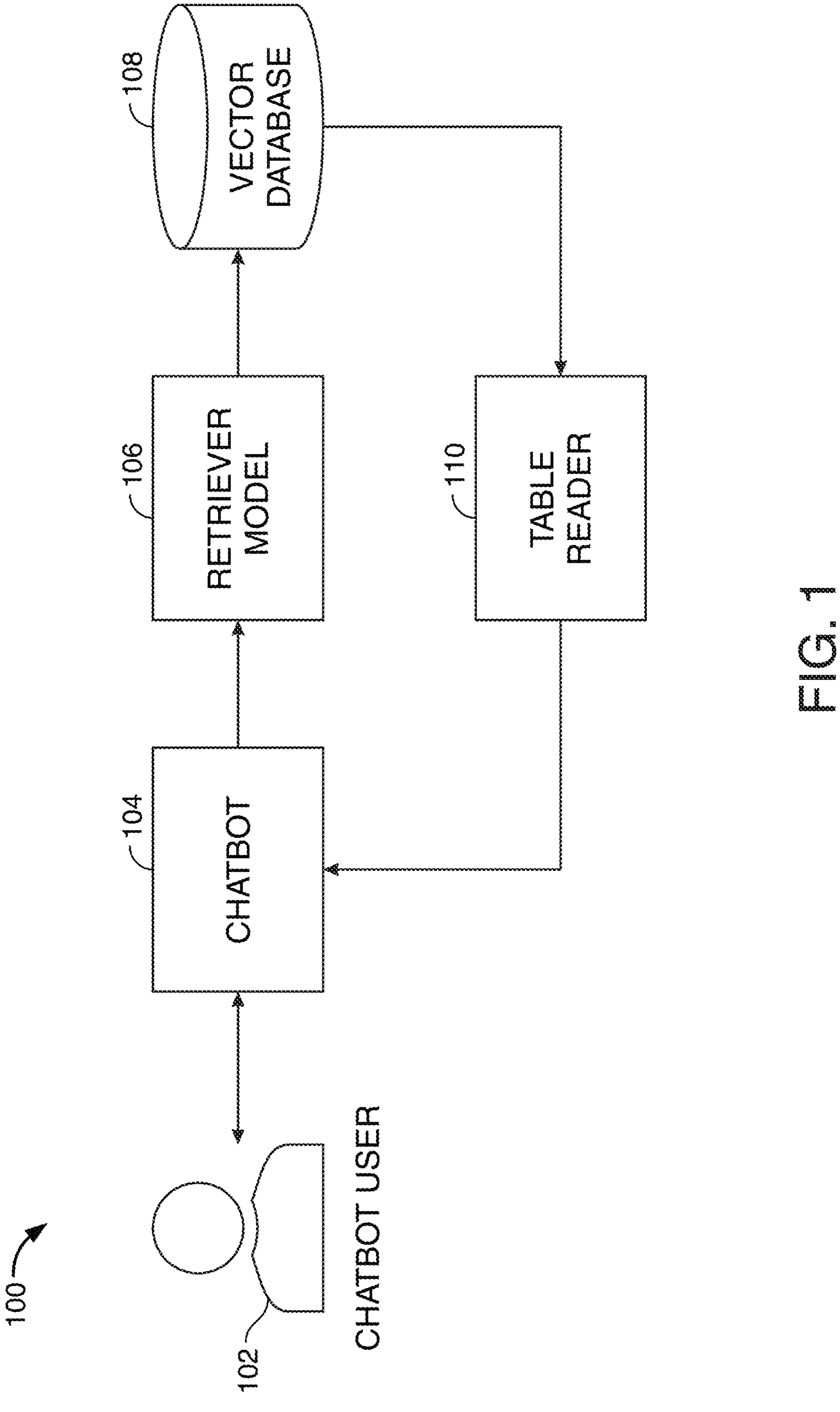
FIG. 1 shows a schematic flow diagram of a method and system in accordance with principles of the disclosure.

System and methods are provided to leverage dynamically structured data sources using vector dataset processing for outputting query responses with reduced processing resources.

The novelty of the presented system lies in its integration of a transformer-based tabular question-answering model with a dynamic vector dataset generation system, enabling chatbots to provide comprehensive and contextually relevant responses to user queries. This combination empowers chatbots to understand and respond to a wide range of questions, leveraging dynamically structured data sources. Additionally, the system's ability to continuously update and generate new tables based on evolving data sources ensures that chatbots have access to the most up-to-date information, regardless of whether they are deployed internally within organizations or externally for customer service purposes.

By dynamically generating tables from regularly updated data sources, the model may gain exposure to evolving patterns and trends without requiring explicit retraining. This approach enables the model to adapt to changing circumstances and user queries in real-time, dependent only on the robust collection of tables generating services employed in the system and how often new tables are generated.

This novel approach may enhance the capabilities of existing chatbots and may shift the responsibility of expansion and scaling from machine learning training to table generation and structuring. Thus, the provided system and methods enable a chatbot and transformer-based tabular question-answering model pair to be universally usable across multiple domains without the need to fine tune or retrain the model for the specific use case.

The collection of common table generation services may include categorical services. Categorical services may include services that fall within categories, e.g., account, tax history, personal information, etc. The collection of common table generation services may include temporal services. Temporal services may include services based on cyclical events.

Cyclical events may include events recurring periodically, e.g., daily, weekly, hourly, and on a schedule. Cyclical events may be dependent on events, e.g., New Years Day. Cyclical events may include commercial events, e.g., home purchase, mortgage, tax filings. Cyclical events may include non-commercial events, e.g., birthdays, holidays, equinoxes, and elections. Herein the term “cyclical events” may include time scheduled events (e.g., hourly, daily, weekly, monthly, etc.) and other life, commercial events (e.g., home purchase, mortgage filing, bank account event, bankruptcy filing, etc.), and non-commercial events (e.g., a celebration, a political election, a seasonal equinox, a national holiday, etc.) that may occur.

The system and methods may include a manual override feature. The manual override feature may enable a user to resort to a traditional chatbot usage. The manual override feature may enable a user to manually extract desired data and answers from a conventional table dataset.

Methods for running an AI chatbot that leverages dynamically structured data sources using vector dataset processing for outputting query responses with reduced processing resources are provided.

The methods may include receiving a query from a user. The methods may include determining if the query is eligible for a bypass processing method. A query may be eligible for a bypass processing method if the query relates to, e.g., personal, commercial, confidential, locked, and private data. A query may also be eligible for a bypass processing method if the query, e.g., contains a password, is a passkey, or is a particular form of query, etc. The methods may include, if the query is not eligible, using a LLM to produce a first answer.

The methods may include, if the query is eligible, processing the query using the bypass processing method to bypass the LLM. The methods may include, instead of using the LLM, implementing a vector-based processing system.

The methods may include using the vector-based processing system. The methods may include transmitting the query to a retriever model. The methods may include using the retriever model to tokenize the query into an input vector.

The methods may include querying a vector database for tables associated with the input vector. The vector database may be configured to capture semantic relationships between the tables. The methods may narrow down possible answers and assist parsing the tables to reduce the quantity of selected tables to be queried. The selected tables may be configured to be dynamically structured for querying.

The methods may include using the retriever model. The methods may include running a similarity search to search the vector database for vectors that have at least a threshold level of commonality to the input vector. The methods may include returning vectors from the vector database that are identified by the similarity search as having at least the threshold level of commonality. A threshold level of commonality may include one or more features in common. The threshold level of commonality may be at least 10 strings of integers in common.

The methods may include transmitting the vectors and the input vector to a transformer-based table reader that includes pretrained routines for answering queries. The methods may include using the transformer-based table reader to produce a second answer to the query by processing the vectors and the input vector using the pretrained routines.

The methods may include providing the user with the second answer to the query. The methods may include updating the vector database to include the input vector. The methods may include processing the query using the bypass processing method uses less processing power and digital bandwidth than the LLM.

The methods may include, prior to the querying, generating answers to projected future queries in response to an event. The methods may include triggering, via the event, a data retriever service.

The methods may include using the data retriever service. The methods may include receiving conventional database data from a cluster of database tables. The cluster of database tables may contain the input vector. The methods may include transmitting the input vector and the conventional database data to a collection of common table generation services.

The methods may include using the collection of common table generation services. The methods may include running a similarity search to search the cluster of database tables for database tables that have at least a threshold level of commonality to the input vector and the conventional database data. The methods may include returning database tables that are identified by the similarity search as having at least the threshold level of commonality. The database tables may include answers to projected future queries in response to the event.

The methods may include transmitting the database tables to a vectorizing service. The methods may include using the vectorizing service. The methods may include tokenizing the database tables into tokenized vectors. The tokenized vectors may be configured to be dynamically structured for the querying. The methods may include updating the vector database to include the tokenized vectors.

The event may be a cyclical event. The cyclical event may include a monthly scheduled event. The cyclical event may include, e.g., a mortgage filing, a bankruptcy filing, a political election, a seasonal equinox, a national holiday, etc.

The cluster of database tables may include data views. The data views may be configured to be available in a table format.

The collection of common table generation services may include categorical services. The collection of common table generation services may include temporal services. The collection of common table generation services may include both categorical and temporal services.

A system for running an AI chatbot that leverages dynamically structured data sources by vector dataset processing for outputting query responses using reduced processing resources is provided.

The system may include a computing processor. The system may include executable instructions. The executable instructions, when executed by the computing processor, may function by operating the system.

The system may function by receiving a query from a user. The system may function by determining if the query is eligible for a bypass processing method.

The system may function by, if the query is not eligible, using a LLM to produce a first answer. The system may function by, if the query is eligible, processing the query using the bypass processing method to bypass the LLM. The system may function by, instead of using the LLM, implementing a vector-based processing system.

The system may function by transmitting the query to a retriever model. The system may function by using the retriever model to tokenize the query into an input vector.

The system may function by querying a vector database for tables associated with the input vector. The vector database may be configured to capture semantic relationships between the tables. The system may narrow down possible answers and assist parsing the tables to reduce the quantity of selected tables to be queried. The selected tables may be configured to be dynamically structured for querying.

The system may function by using the retriever model. The system may function by running a similarity search to search the vector database for vectors that have at least a threshold level of commonality to the input vector.

The system may function by returning vectors from the vector database that are identified by the similarity search as having at least the threshold level of commonality. The system may function by transmitting the vectors and the input vector to a transformer-based table reader that includes pretrained routines for answering queries.

The system may function by using the transformer-based table reader to produce a second answer to the query by processing the vectors and the input vector using the pretrained routines. The system may function by providing the user with the second answer to the query.

The system may function by updating the vector database to include the input vector. The system may function by processing the query using the bypass processing method uses less processing power and digital bandwidth than the LLM.

The system may function by, prior to the querying, generating answers to projected future queries in response to an event. The generating may include triggering, via the event, a data retriever service.

The system may function by using the data retriever service. The system may function by receiving conventional database data from a cluster of database tables. The cluster of database tables may contain the input vector.

The system may function by transmitting the input vector and the conventional database data to a collection of common table generation services. The system may function by using the collection of common table generation services.

The system may function by running a similarity search to search the cluster of database tables for database tables that have at least a threshold level of commonality to the input vector and the conventional database data.

The system may function by returning database tables that are identified by the similarity search as having at least the threshold level of commonality. The database tables may include answers to projected future queries in response to the event.

The system may function by transmitting the database tables to a vectorizing service. The system may function by using the vectorizing service.

The system may function by tokenizing the database tables into tokenized vectors. The tokenized vectors may be configured to be dynamically structured for the querying. The system may function by updating the vector database to include the tokenized vectors.

The system may function by being triggered by an event. The event may be a cyclical event. The cyclical event may include a monthly scheduled event.

The system may include a cluster of database tables. The cluster of database tables may include data views. The data views may be configured to be available in a table format.

The system may include a collection of common table generation services. The collection of common table generation services may include categorical services. The collection of common table generation services may include temporal services. The collection of common table generation services may include both categorical and temporal services.

The system may include a threshold of commonality. The threshold level of commonality may be at least 10 strings of integers in common.

A method for running an AI chatbot that leverages dynamically structured data sources using vector dataset processing for outputting query responses with reduced processing resources is provided. The method may include receiving a query from a user.

The method may include determining if the query is eligible for a bypass processing method. The method may include, if the query is not eligible, using a LLM to produce a first answer.

The method may include, if the query is eligible, processing the query using the bypass processing method to bypass the LLM. The method may include, instead of using the LLM, implementing a vector-based processing system.

The method may include transmitting the query to a retriever model. The method may include using the retriever model to tokenize the query into an input vector.

The method may include generating answers to projected future queries in response to an event. The generating may include triggering, via the event, a data retriever service.

The method may include using the data retriever service. The method may include receiving conventional database data from a cluster of database tables. The cluster of database tables may contain the input vector.

The method may include transmitting the input vector and the conventional database data to a collection of common table generation services. The method may include using the collection of common table generation services.

The method may include running a similarity search to search the cluster of database tables for database tables that have at least a threshold level of commonality to the input vector and the conventional database data. The method may include returning database tables that are identified by the similarity search as having at least the threshold level of commonality. The database tables may include answers to projected future queries in response to the event.

The method may include transmitting the database tables to a vectorizing service. The method may include using the vectorizing service. The method may include tokenizing the database tables into tokenized vectors. The tokenized vectors may be configured to be dynamically structured for the querying.

The method may include updating the vector database to include the tokenized vectors. The method may include querying a vector database for tables associated with the input vector.

The vector database may be configured to capture semantic relationships between the tables. Capturing semantic relationships between the tables may narrow down possible answers and assist parsing the tables to reduce the quantity of selected tables to be queried. The selected tables may be configured to be dynamically structured for querying.

The method may include using the retriever model. The method may include running a similarity search to search the vector database for vectors that have at least a threshold level of commonality to the input vector. The method may include returning vectors from the vector database that are identified by the similarity search as having at least the threshold level of commonality.

The method may include transmitting the vectors and the input vector to a transformer-based table reader that includes pretrained routines for answering queries. The method may include using the transformer-based table reader to produce a second answer to the query by processing the vectors and the input vector using the pretrained routines.

The method may include providing the user the second answer to the query. The method may include updating the vector database to include the input vector. The method may include processing the query using the bypass processing method uses less processing power and digital bandwidth than the LLM.

The steps of illustrative methods may be performed in an order other than the order shown or described herein. Some embodiments may omit steps shown or described in connection with the illustrative methods. Some embodiments may include steps that are neither shown nor described in connection with the illustrative methods. Illustrative method steps may be combined. For example, one illustrative method may include steps shown in connection with another illustrative method.

Some embodiments may omit features shown or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment. Embodiments may involve some or all of the features of the illustrative apparatus or some or all of the steps of the illustrative methods.

The illustrative system and methods will now be described with reference to the accompanying Figures, which form a part hereof. It is to be understood that other embodiments may be utilized, and that structural, functional, and procedural modifications may be made without departing from the scope and spirit of the present disclosure.

FIG. 1 shows an exemplary flow diagram 100 of a method and system in accordance with the principles of the disclosure.

The method and system 100 may include receiving an input from chatbot user 102. The input may be a question. The input may be, e.g., a natural language question. Chatbot 104 may receive the input from chatbot user 102. Chatbot 104 may communicate with chatbot user 102.

This question may be passed to a retriever model 106. The retriever model 106 may tokenize the question into a vector, i.e., an input vector. The retriever model 106 may query a vector database 108 for a relevant table associated with the input vector.

The data may be stored in the vector database 108 to capture semantic relationships between tables. When the retriever model 106 searches the vector database 108 using a tokenized form of the user query, the vector database 108 may return vectors that are most similar to the token vector input. This may enable the retriever model 106 to return the most relevant data given a natural language user query.

The vector database 108 may send relevant data to a transformer-based table reader 110 to process as input along with the tokenized question. The table reader 110 may process both the data retrieved from the vector database 108 and the tokenized question to generate a response for the chatbot user 102.

The table reader 110 may utilize a transformer architecture that is specifically designed and pretrained for answering questions about tabular data. This model ("the table reader model") paired with the frequent and specialized generation of tables based on features regarding a user's data or internal domain knowledge is what powers the deep intelligence retrieval of insights.

Figure 2:
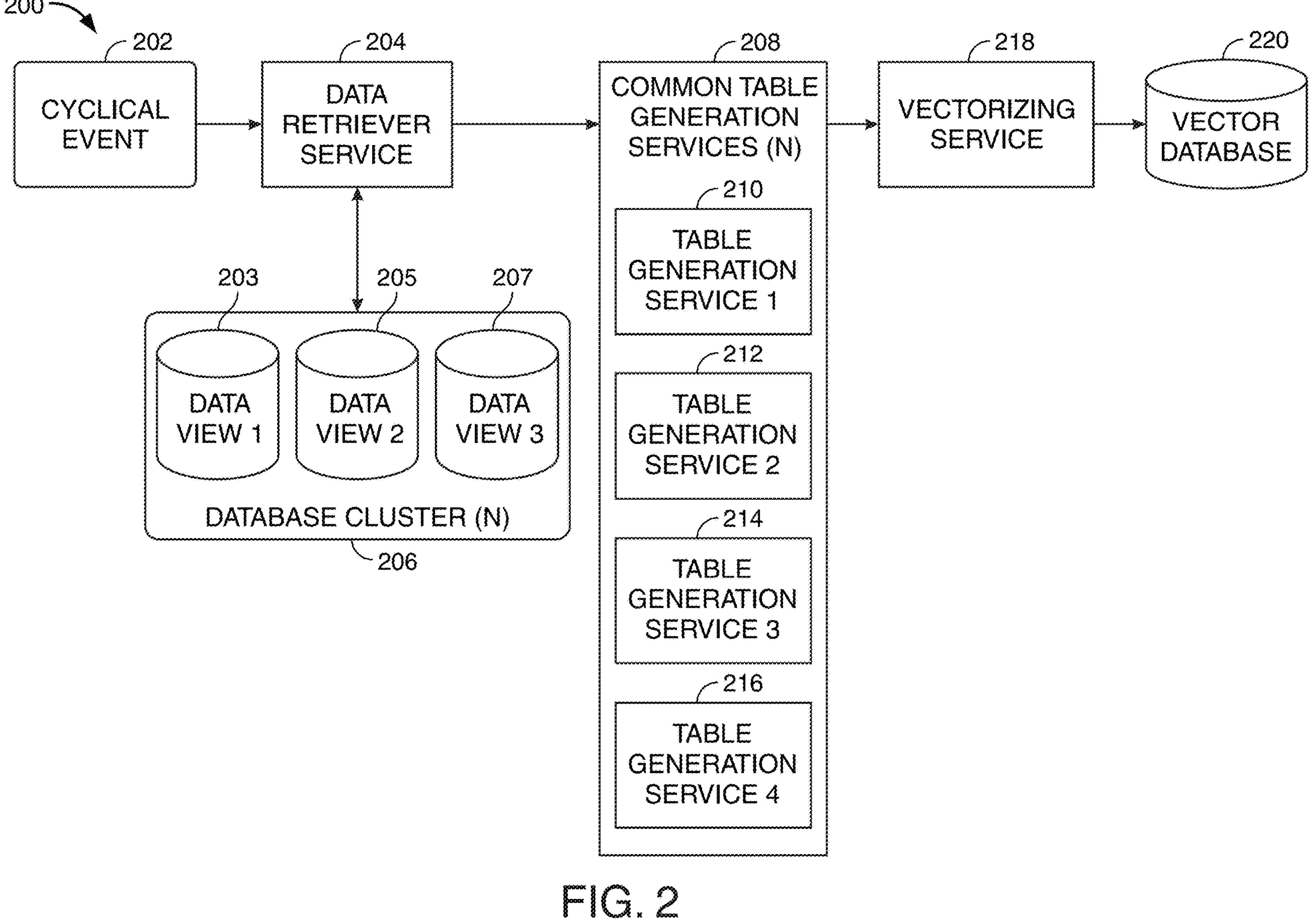
FIG. 2 shows an illustrative system and method in accordance with principles of the disclosure.

FIG. 2 shows an illustrative system and method 200 in accordance with principles of the disclosure.

The system and method 200 may include regenerating and adding tables to the vector database 220 on a routine event schedule. The routine event schedule may include a cyclical event 202. The cyclical event 202 may trigger a data retriever service 204. The data retriever service 204 may retrieve conventional database data from a database cluster 206 (N). The database cluster 206 may generate N data views (e.g., data view 1, 203, data view 2, 205, and data view 3, 207, etc.). A data view may be configured to present the data in a table format. Data view 1 may be, e.g., credit card account information. Data view 2 may be, e.g., bank account information. The database cluster 206 may be a cluster of database tables containing a chatbot user's data or internal domain data. The data retriever service 204 may send this data to a collection of common table generation services 208 (N number of them). The common table generation services 208 may generate N new tables.

The common table generation services 208 may generate new tables as table generation services (e.g., table generation service 1, 210, table generation service 2, 212, table generation service 3, 214, and table generation service 4, 216, etc.). Table generation service 1 may be, e.g., a categorical service. The categorical service may align with features a user may desire. For example, a categorical service may transfer data from a conventional source in the form of categories. Categories of commercial services and data may include, e.g., dining, housing, utilities, etc. Table generation service 2 may be, e.g., a temporal service. The temporal service may be, for example, collecting data the first of every month (January, February, March, etc.).

The tables may be structured to be interpreted by a table reader model downstream. The common table generation services 208 may send data to a vectorizing service 218 to tokenize the data. This tokenized data may be stored in the vector database 220.

A user query may be, e.g., "how is my spending this week?" Table generation services may find metadata regarding user spending in a table. A column for a running total may be added to the table before vectorizing. Thus, the table contains a running list of spending data in real-time. An answer to the query may be, e.g., "your spending is $50 less than last week." In such a case, weekly temporal services may be used.

Figure 3:
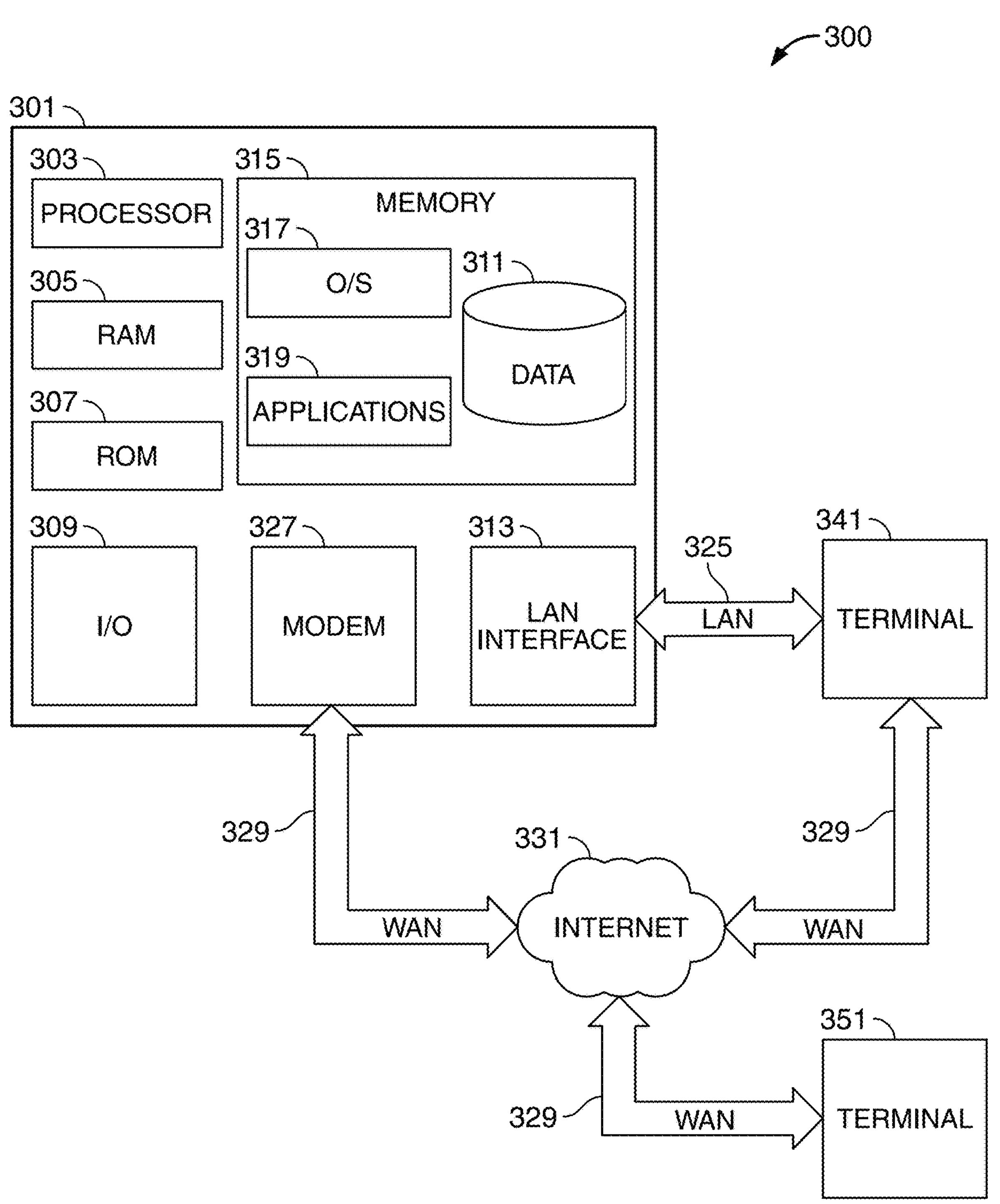
FIG. 3 shows an illustrative system in accordance with principles of the disclosure.

FIG. 3 shows an illustrative block diagram of system 300 that includes computer 301. Computer 301 may alternatively be referred to herein as an "engine," "server" or a "computing device." Computer 301 may be a workstation, desktop, laptop, tablet, smartphone, or any other suitable computing device. Elements of system 300, including computer 301, may be used to implement various aspects of the systems and methods disclosed herein. Each of the systems, methods and algorithms illustrated below may include some or all of the elements and apparatus of system 300.

Computer 301 may have a processor 303 for controlling the operation of the device and its associated components, and may include RAM 305, ROM 307, input/output ("I/O") 309, and a non-transitory or non-volatile memory 315. Machine-readable memory may be configured to store information in machine-readable data structures. The processor 303 may also execute all software running on the computer. Other components commonly used for computers, such as EEPROM or Flash memory or any other suitable components, may also be part of the computer 301.

The memory 315 may be comprised of any suitable permanent storage technology—e.g., a hard drive. The memory 315 may store software including the operating system 317 and application program(s) 319 along with any data 311 needed for the operation of the system 300. Memory 315 may also store videos, text, and/or audio assistance files. The data stored in memory 315 may also be stored in cache memory, or any other suitable memory.

I/O module 309 may include connectivity to a microphone, keyboard, touch screen, mouse, and/or stylus through which input may be provided into computer 301. The input may include input relating to cursor movement. The input/output module may also include one or more speakers for providing audio output and a video display device for providing textual, audio, audiovisual, and/or graphical output. The input and output may be related to computer application functionality.

System 300 may be connected to other systems via a local area network ("LAN") interface 313. System 300 may operate in a networked environment supporting connections to one or more remote computers, such as terminals 341 and 351. Terminals 341 and 351 may be personal computers or servers that include many or all of the elements described above relative to system 300. The network connections depicted in FIG. 3 include a LAN 325 and a wide area network ("WAN") 329 but may also include other networks. When used in a LAN networking environment, computer 301 is connected to LAN 325 through LAN interface 313 or an adapter. When used in a WAN networking environment, computer 301 may include a modem 327 or other means for establishing communications over WAN 329, such as Internet 331.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 319, which may be used by computer 301, may include computer executable instructions for invoking functionality related to communication, such as e-mail, Short Message Service ("SMS"), and voice input and speech recognition applications. Application program(s) 319 (which may be alternatively referred to herein as "plugins," "applications," or "apps") may include computer executable instructions for invoking functionality related to performing various tasks. Application program(s) 319 may utilize one or more algorithms that process received executable instructions, perform power management routines or other suitable tasks.

Application program(s) 319 may include computer executable instructions (alternatively referred to as "programs"). The computer executable instructions may be embodied in hardware or firmware (not shown). The computer 301 may execute the instructions embodied by the application program(s) 319 to perform various functions.

Application program(s) 319 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 311, and any other suitable information, may be stored in memory 315.

The disclosure may be described in the context of computer-executable instructions, such as application(s) 319, being executed by a computer. Generally, programs include routines, programs, objects, components, data structures, etc., that perform particular tasks or implement particular data types. The disclosure may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 301 and/or terminals 341 and 351 may also include various other components, such as a battery, speaker, and/or antennas (not shown). Components of computer system 301 may be linked by a system bus, wirelessly or by other suitable interconnections. Components of computer system 301 may be present on one or more circuit boards. In some embodiments, the components may be integrated into a single chip. The chip may be silicon-based.

Terminal 341 and/or terminal 351 may be portable devices such as a laptop, cell phone, tablet, smartphone, or any other computing system for receiving, storing, transmitting and/or displaying relevant information. Terminal 341 and/or terminal 351 may be one or more user devices. Terminals 341 and 351 may be identical to system 300 or different. The differences may be related to hardware components and/or software components.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 4:
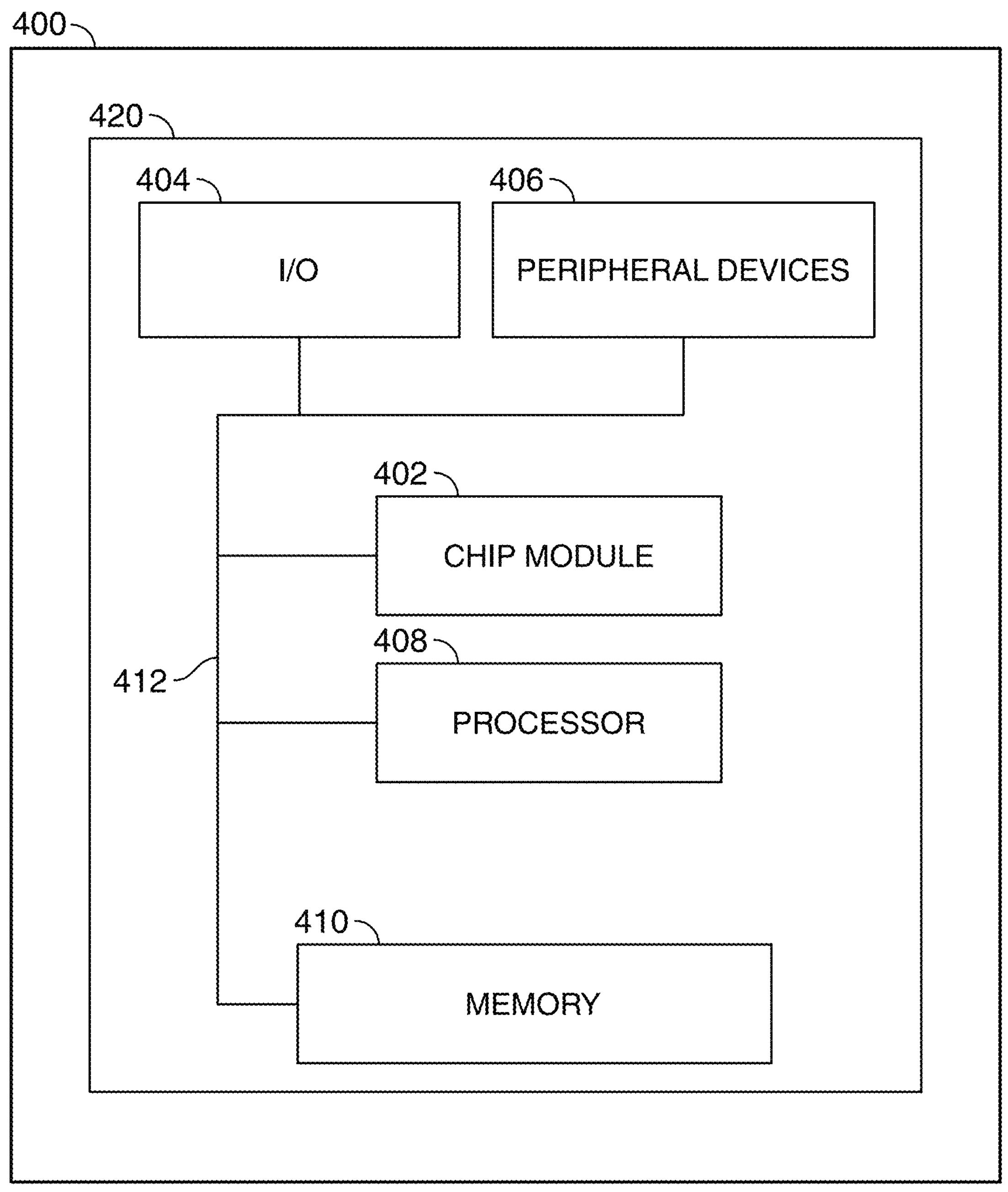
FIG. 4 shows an illustrative system in accordance with principles of the disclosure.

FIG. 4 shows illustrative apparatus 400 that may be configured in accordance with the principles of the disclosure. Apparatus 400 may be a computing device. Apparatus 400 may include one or more features of the apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions, (which may be alternatively referred to herein as "computer instructions" or "computer code"), applications such as applications 319, signals, and/or any other suitable information or data structures.

Components 402, 404, 406, 408 and 410 may be coupled together by a system bus or other interconnections 412 and may be present on one or more circuit boards such as circuit board 420. In some embodiments, the components may be integrated into a single chip. The chip may be silicon-based.

As will be appreciated by one of skill in the art, methods and apparatus shown or described herein may be embodied in whole or in part as a method, an apparatus or product by process. Accordingly, such apparatus may take the form of, and such methods may be performed by, an entirely hardware embodiment, an entirely software embodiment or an embodiment combining software, hardware and any other suitable approach or apparatus.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, system and methods using cyclical vector dataset generation for chatbot intelligence enhancement are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for running an artificial intelligence (AI) chatbot that leverages dynamically structured data sources using vector dataset processing for outputting query responses with reduced processing resources, the method comprising:

receiving a query from a user;

determining whether the query is eligible for a bypass processing method;

when the query is not eligible, using a large language model (LLM) to produce a first answer;

when the query is eligible, processing the query using the bypass processing method to bypass the LLM and, instead of using the LLM, implementing a vector-based processing system by:

transmitting the query to a retriever model;

using the retriever model to tokenize the query into an input vector;

querying a vector database for tables associated with the input vector, wherein:

the vector database is configured to capture semantic relationships between the tables, and, as a result, narrow down possible answers and assist parsing the tables to reduce a quantity of selected tables to be queried;

the selected tables are configured to be dynamically structured for querying; and the selected tables are structured for interpretation by a transformer-based table reader model downstream, and the transformer-based table reader includes a transformer architecture specifically designed and pretrained for answering questions about tabular data;

using the retriever model:

running a similarity search to search the vector database for vectors that have at least a threshold level of commonality to the input vector;

wherein the similarity search comprises a k-nearest neighbor (kNN) search run in tokenized form using a dictionary of tokens representing key-value pairs, wherein the key-value pairs are mapped in token sets; and returning vectors from the vector database that are identified by the similarity search as having at least the threshold level of commonality;

transmitting the vectors and the input vector to the transformer-based table reader that includes pretrained routines for answering queries;

using the transformer-based table reader to produce a second answer to the query by processing the vectors and the input vector using the pretrained routines;

providing to the user the second answer to the query; and updating the vector database to include the input vector; wherein:

a collection of common table generation services explicitly write data into the vector database such that the transformer-based table reader sources answers to user queries regarding metadata entries without performing additional logic and without preprocessing on the table prior to prompting the transformer-based table reader; and processing the query using the bypass processing method uses less processing power and digital bandwidth than the LLM.

2. The method of claim 1 further comprising, prior to the querying, generating answers to projected future queries in response to an event, the generating comprising:
triggering, via the event, a data retriever service;
using the data retriever service:
receiving conventional database data from a cluster of database tables, the cluster of database tables containing the input vector;
transmitting the input vector and the conventional database data to the collection of common table generation services;
using the collection of common table generation services:
running a similarity search to search the cluster of database tables for database tables that have at least a threshold level of commonality to the input vector and the conventional database data;
returning database tables that are identified by the similarity search as having at least the threshold level of commonality, the database tables including answers to the projected future queries in response to the event;
transmitting the database tables to a vectorizing service; and
using the vectorizing service:
tokenizing the database tables into tokenized vectors, the tokenized vectors configured to be dynamically structured for the querying; and
updating the vector database to include the tokenized vectors.

3. The method of claim 2 wherein the event is a cyclical event.

4. The method of claim 3 wherein the cyclical event includes a monthly scheduled event.

5. The method of claim 3 wherein the cyclical event includes a mortgage filing.

6. The method of claim 2 wherein the cluster of database tables comprises data views, and the data views are configured to be available in a table format.

7. The method of claim 2 wherein the collection of common table generation services includes categorical services.

8. The method of claim 2 wherein the collection of common table generation services includes temporal services.

9. The method of claim 2 wherein the collection of common table generation services includes both categorical and temporal services.

10. The method of claim 2 wherein the threshold level of commonality is at least 10 strings of integers in common.

11. System for running an artificial intelligence ("AI") chatbot that leverages dynamically structured data sources by vector dataset processing for outputting query responses using reduced processing resources, the system comprising a computing processor and executable instructions that, when executed by the computing processor, function by:
receiving a query from a user;
determining whether the query is eligible for a bypass processing method;
when the query is not eligible, using a large language model (LLM) to produce a first answer;
when the query is eligible, processing the query using the bypass processing method to bypass the LLM and, instead of using the LLM, implementing a vector-based processing system by:
transmitting the query to a retriever model;
using the retriever model to tokenize the query into an input vector;
querying a vector database for tables associated with the input vector, wherein:
the vector database is configured to capture semantic relationships between the tables, and, as a result, narrow down possible answers and assist parsing the tables to reduce a quantity of selected tables to be queried;
the selected tables are configured to be dynamically structured for querying; and
the selected tables are structured for interpretation by a transformer-based table reader model downstream, and the transformer-based table reader includes a transformer architecture specifically designed and pretrained for answering questions about tabular data;
using the retriever model:
running a similarity search to search the vector database for vectors that have at least a threshold level of commonality to the input vector;
wherein the similarity search comprises a k-nearest neighbor (kNN) search run in tokenized form using a dictionary of tokens representing key-value pairs, wherein the key-value pairs are mapped in token sets; and
returning vectors from the vector database that are identified by the similarity search as having at least the threshold level of commonality;
transmitting the vectors and the input vector to the transformer-based table reader that includes pretrained routines for answering queries;
using the transformer-based table reader to produce a second answer to the query by processing the vectors and the input vector using the pretrained routines;
providing to the user the second answer to the query; and
updating the vector database to include the input vector; wherein:
a collection of common table generation services explicitly write data into the vector database such that the transformer-based table reader sources answers to user queries regarding metadata entries without performing additional logic and without preprocessing on the table prior to prompting the transformer-based table reader; and
processing the query using the bypass processing method uses less processing power and digital bandwidth than the LLM.

12. The system of claim 11 further comprising, prior to the querying, generating answers to projected future queries in response to an event, the generating comprising:
triggering, via the event, a data retriever service;
using the data retriever service:
receiving conventional database data from a cluster of database tables, the cluster of database tables containing the input vector;
transmitting the input vector and the conventional database data to the collection of common table generation services;
using the collection of common table generation services:
running a similarity search to search the cluster of database tables for database tables that have at least a threshold level of commonality to the input vector and the conventional database data;

returning database tables that are identified by the similarity search as having at least the threshold level of commonality, the database tables including answers to the projected future queries in response to the event;

transmitting the database tables to a vectorizing service; and using the vectorizing service:

tokenizing the database tables into tokenized vectors, the tokenized vectors configured to be dynamically structured for the querying; and updating the vector database to include the tokenized vectors.

13. The system of claim 12 wherein the event is a cyclical event.

14. The system of claim 13 wherein the cyclical event includes a monthly scheduled event.

15. The system of claim 12 wherein the cluster of database tables comprises data views, and the data views are configured to be available in a table format.

16. The system of claim 12 wherein the collection of common table generation services includes categorical services.

17. The system of claim 12 wherein the collection of common table generation services includes temporal services.

18. The system of claim 12 wherein the collection of common table generation services includes both categorical and temporal services.

19. The system of claim 12 wherein the threshold level of commonality is at least 10 strings of integers in common.

20. A method for running an artificial intelligence ("AI") chatbot that leverages dynamically structured data sources using vector dataset processing for outputting query responses with reduced processing resources, the method comprising:

receiving a query from a user;

determining whether the query is eligible for a bypass processing method;

when the query is not eligible, using a large language model (LLM) to produce a first answer;

when the query is eligible, processing the query using the bypass processing method to bypass the LLM and, instead of using the LLM, implementing a vector-based processing system by:

transmitting the query to a retriever model;

using the retriever model to tokenize the query into an input vector;

generating answers to projected future queries in response to an event, the generating comprising:

triggering, via the event, a data retriever service;

using the data retriever service:

receiving conventional database data from a cluster of database tables, the cluster of database tables containing the input vector;

transmitting the input vector and the conventional database data to the collection of common table generation services;

using the collection of common table generation services:

running a similarity search to search the cluster of database tables for database tables that have at least a threshold level of commonality to the input vector and the conventional database data;

returning database tables that are identified by the similarity search as having at least the threshold level of commonality, the database tables including answers to the projected future queries in response to the event;

transmitting the database tables to a vectorizing service; and using the vectorizing service:

tokenizing the database tables into tokenized vectors, the tokenized vectors configured to be dynamically structured for the querying; and updating the vector database to include the tokenized vectors;

querying a vector database for tables associated with the input vector, wherein:

the vector database is configured to capture semantic relationships between the tables, and, as a result, narrow down possible answers and assist parsing the tables to reduce a quantity of selected tables to be queried;

the selected tables are configured to be dynamically structured for querying; and the selected tables are structured for interpretation by a transformer-based table reader model downstream, and the transformer-based table reader includes a transformer architecture specifically designed and pretrained for answering questions about tabular data;

using the retriever model:

running a similarity search to search the vector database for vectors that have at least a threshold level of commonality to the input vector;

wherein the similarity search comprises a k-nearest neighbor (kNN) search run in tokenized form using a dictionary of tokens representing key-value pairs, wherein the key-value pairs are mapped in token sets; and returning vectors from the vector database that are identified by the similarity search as having at least the threshold level of commonality;

transmitting the vectors and the input vector to the transformer-based table reader that includes pretrained routines for answering queries;

using the transformer-based table reader to produce a second answer to the query by processing the vectors and the input vector using the pretrained routines;

providing to the user the second answer to the query; and updating the vector database to include the input vector; wherein:

a collection of common table generation services explicitly write data into the vector database such that the transformer-based table reader sources answers to user queries regarding metadata entries without performing additional logic and without preprocessing on the table prior to prompting the transformer-based table reader; and processing the query using the bypass processing method uses less processing power and digital bandwidth than the LLM.

* * * * *